June 29, 1926.
W. R. BELDAM
PACKING SUCH AS IS USED FOR PISTON RODS
Filed Oct. 28, 1924
1,590,801
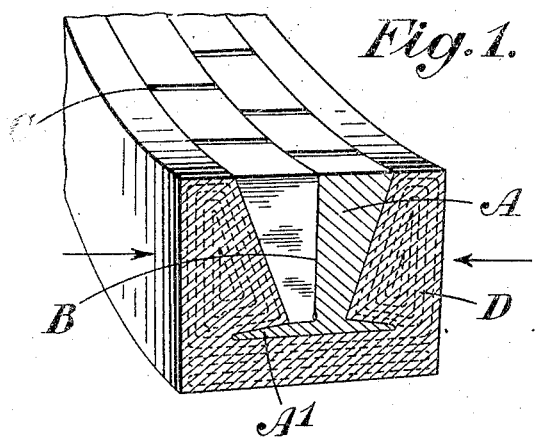
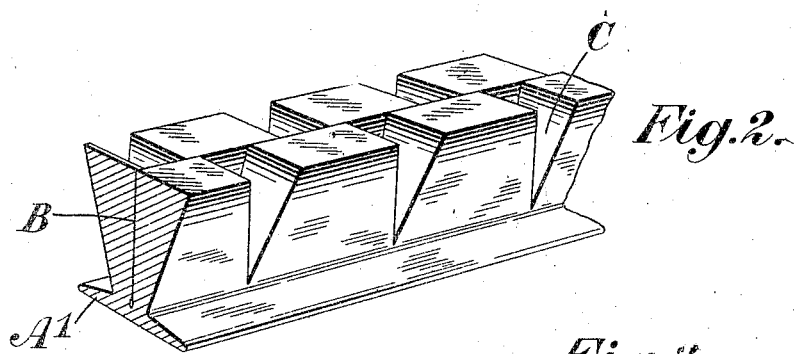
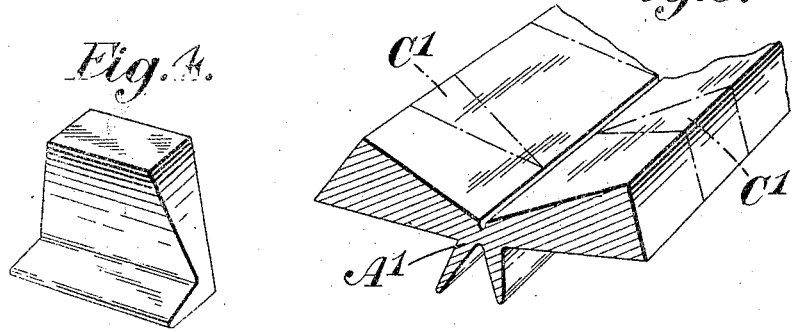
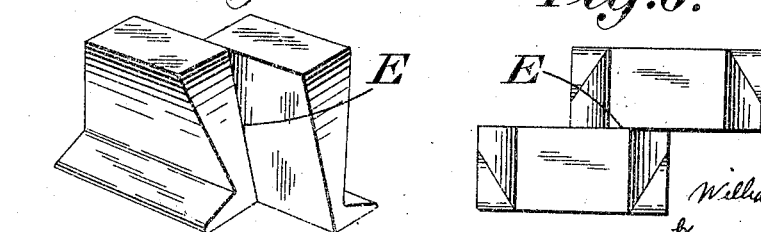
INVENTOR
William R. Beldam,
by Byrnes, Stebbins & Parmelee,
his Attys.

Patented June 29, 1926.

1,590,801

UNITED STATES PATENT OFFICE.

WILLIAM ROBERT BELDAM, OF HOUNSLOW, ENGLAND, ASSIGNOR TO BELDAM ASBESTOS COMPANY LIMITED, OF HOUNSLOW, ENGLAND, A BRITISH COMPANY.

PACKING SUCH AS IS USED FOR PISTON RODS.

Application filed October 28, 1924, Serial No. 746,351, and in Great Britain August 28, 1924.

The invention relates to packing for piston-rods and other members requiring in a similar way to be packed, and has for its object to provide an improved construction of packing.

Packing according to this invention comprises, in combination, a soft-metal core of V-shape in cross-section to be disposed around the member to be packed with the wider part of the core radially innermost, which core comprises segments which, when the packing is in position, lie closely together, overlap one another and bear against one another where they overlap, and fibrous packing material at each side of the core, said core having a laterally projecting portion which so engages the packing material as to prevent undue wedging action of the core segments against the member to be packed.

Similar forms of packing have had the fibrous packing material secured to the metal portion by wiring, and this renders the manufacture of the packing expensive.

With packing according to the present invention this difficulty is overcome for the lateral projecting portions, which may take the form of longitudinally extending flanges, serve both to modify the wedge action on the segments and also to secure the fibrous packing to the core or, as it is sometimes termed, the packing strip.

The object of making the metal strip of V-shaped cross-section and applying the soft backing to the V-shaped portion is to cause the latter to wedge the metal forward when the gland-nut is tightened so that the operative face of the packing is made to press against the part to be packed, and it will be appreciated that if lateral projections are provided on the packing-strip to engage the soft backing as aforesaid, this wedging action will be modified. It is found that when no such projections are used, the wedging action is sometimes so great as to set up undue friction and resultant rapid wear of the packing-strip.

In the accompanying drawings:—

Figure 1 is a perspective view of a part of a packing-strip with its backing attached, viewed approximately endwise;

Figure 2 is a perspective view of the metal strip alone;

Figure 3 shows the metal strip before its formation is completed;

Figure 4 illustrates part of a composite strip;

Figure 5 shows another form of part of a composite strip, and

Figure 6 is a plan of the part shown in Figure 5.

The metal strip A is provided with a foot $A^1$ which projects laterally on both sides of the strip. The strip is divided longitudinally at B down to the foot but not through the foot, and it is provided at C with V-shaped slots which extend from the edge to the centre of the strip and down to the foot, those on one side of the strip being staggered relatively to those on the other.

This strip may be made in any desired manner and is similar to those already in use, except that the foot $A^1$ has not heretofore been provided.

Conveniently, the strip is rolled or extruded in the form shown in Figure 3 and then the portions indicated at $C^1$ are cut out and afterwards the two halves are folded together to bring the strip to the form shown in Figure 2.

However the strip is made, the soft backing D is afterwards added, being moulded in position by hydraulic or other means, so that the foot $A^1$ holds it in place.

It will be seen, with this construction of packing, that if pressure is applied to the backing in the directions indicated by the arrows, Figure 1, the metal strip will be wedged forward against the part to be packed, such as the piston-rod, but the foot $A^1$ will modify the degree of thrust conveyed to the strip in the direction radial to the piston-rod.

Instead of the strip being made integral as indicated in Figures 1–3, it may be composite, for example it may be built up of a number of units, such as is shown in Figure 4, laid side by side in two rows with the flat faces together and in staggered relation. These units will be held together by the backing, which would be applied as a continuous body. In Figures 5 and 6 the unit shown in Figure 4 is duplicated so that it constitutes part of both of the rows which would be afforded by the units shown in Figure 4. This unit shown in Figures 5 and 6 may or may not be slotted down at E from the operative face to the foot.

The units shown in Figure 4 and in Figures 5 and 6 could also be multiple, that is to say, each unit might comprise three or four parts, such as is shown in these figures, joined end to end.

A further modification could be made by making the metal strip composite in the sense that the slot B is carried right through the foot so that the strip is divided longitudinally throughout its length.

I claim:

1. A semi-metallic packing, comprising a soft metal wedge-shaped core having a relatively thin and substantially flat flange lying adjacent the apex portion of the wedge and to either side thereof and projecting laterally therefrom substantially parallel to the working face of the core, and a mass of fibrous packing material encasing the core, the wide face of the core being exposed on the working face of the packing, said flange serving to modify the tendency of the core to wedge out of the fibrous material when the fibrous material is compressed, substantially as described.

2. A semi-metallic packing, comprising a soft metal core and a fibrous packing material in which the core is embedded so that only the working face of the core is exposed, the core comprising a thin metal strip having integral upstanding wedge-shaped portions which lie adjacent one another and overlap when the packing is in use, the wider ends of the wedge-shaped portions being exposed as a working face through the fibrous packing, the thin metal strip extending laterally to each side of the narrow end of the wedge-shaped portions, thus forming substantially flat flanges, said flanges serving to hold the core in the fibrous packing and to materially modify the tendency of the core to wedge out of the fibrous material when the fibrous material is compressed, substantially as described.

3. A semi-metallic packing, comprising, in combination, a soft metal core to be disposed around and in contact with the member to be packed and fibrous packing material held against the side walls of the core, the core being V-shaped in cross-section so as to be wedged towards said member by pressure exerted upon the packing in a direction transverse to the side walls thereof, and formed with a fin-like projection extending from the outer margin of the core in a direction substantially parallel to the direction of the pressure aforesaid, which projection serves to effect a keying engagement between the core and the packing material and is so shaped that the outer face is substantially normal to the line of wedge-action-thrust of the core towards the member to be packed, for the purpose described.

4. A semi-metallic packing comprising, in combination, a soft metal core to be disposed around and in contact with the member to be packed and fibrous packing material held against the side walls of the core, the core being V-shaped in cross-section so as to be wedged towards said member by pressure exerted upon the packing in a direction transverse to the side walls thereof, and formed with a fin-like projection extending from the outer margin of the core in a direction substantially parallel to the direction of the pressure aforesaid, which projection serves to effect a keying engagement between the core and the packing material and is so shaped that the inner face is substantially normal to the line of wedge-action-thrust of the core towards the member to be packed, for the purpose described.

5. A semi-metallic packing comprising, in combination, a soft metal core to be disposed around and in contact with the member to be packed and fibrous packing material held against the side walls of the core, the core being V-shaped in cross-section so as to be wedged towards said member by pressure exerted upon the packing in a direction transverse to the side walls thereof, and formed with a fin-like projection extending from the outer margin of the core in a direction substantially parallel to the direction of the pressure aforesaid, which projection serves to effect a keying engagement between the core and the packing material and is so shaped that both the outer and inner faces are substantially normal to the line of wedge-action-thrust of the core towards the member to be packed, for the purpose described.

6. A semi-metallic packing comprising, in combination, a soft metal core to be disposed around and in contact with the member to be packed and fibrous packing material adapted to be held against the side walls of the core, the core being V-shaped in cross-section so as to be wedged towards said member by pressure exerted upon the packing in a direction transverse to the side walls thereof, and subdivided into two circumferentially extending rows of overlapping segments, and formed with a fin-like projection extending from the outer margin of the core in a direction substantially parallel to the direction of the pressure aforesaid, which projection serves to effect a keying engagement between the core and the packing material and is so shaped that the outer face is substantially normal to the line of wedge-action-thrust of the core towards the member to be packed, for the purpose described.

7. A semi-metallic packing comprising, in combination, a soft metal core to be disposed around and in contact with the member to be packed and fibrous packing material adapted to be held against the side walls of the core, the core being V-shaped in cross-section so as to be wedged towards said member by pressure exerted upon the packing in a direction transverse to the side walls thereof, and subdivided into two circumferentially extending rows of overlapping segments, and formed with a fin-like projection extending from the outer margin of the core in a direction substantially parallel to the direction of the pressure aforesaid, which projection serves to effect a keying engagement between the core and the packing material and is so shaped that the inner face is substantially normal to the line of wedge-action-thrust of the core towards the member to be packed, for the purpose described.

8. A semi-metallic packing comprising, in combination, a soft metal core to be disposed around and in contact with the member to be packed and fibrous packing material held against the side walls of the core, the core being V-shaped in cross-section so as to be wedged towards said member by pressure exerted upon the packing in a direction transverse to the side walls thereof, and subdivided into two circumferentially extending rows of overlapping segments, and formed with a fin-like projection extending from the outer margin of the core in a direction substantially parallel to the direction of the pressure aforesaid, which projection serves to effect a keying engagement between the core and the packing material and is so shaped that both the outer and inner faces are substantially normal to the line of wedge-action-thrust of the core towards the member to be packed, for the purpose described.

9. A semi-metallic packing comprising, in combination, a soft metal core to be disposed around and in contact with the member to be packed and fibrous packing material held against the side walls of the core, the core being V-shaped in cross-section so as to be wedged towards said member by pressure exerted upon the packing in a direction transverse to the side walls thereof, and subdivided into two circumferentially extending rows of over-lapping segments, and formed with two fin-like projections extending from the outer margin of the core in opposite directions substantially parallel to the direction of the pressure aforesaid, which projections serve to effect a keying engagement between the core and the packing material and are so shaped that the outer face is substantially normal to the line of wedge-action-thrust of the core towards the member to be packed, for the purpose described.

10. A semi-metallic packing comprising, in combination, a soft metal core to be disposed around and in contact with the member to be packed and fibrous packing material held against the side walls of the core, the core being V-shaped in cross-section so as to be wedged towards said member by pressure exerted upon the packing in a direction transverse to the side walls thereof, and subdivided into two circumferentially extending rows of over-lapping segments, and formed with two fin-like projections extending from the outer margin of the core in opposite directions substantially parallel to the direction of the pressure aforesaid, which projections serve to effect a keying engagement between the core and the packing material and are so shaped that the inner face is substantially normal to the line of wedge-action-thrust of the core towards the member to be packed, for the purpose described.

11. A semi-metalic packing comprising, in combination, a soft metal core to be disposed around and in contact with the member to be packed and fibrous packing material held against the side walls of the core, the core being V-shaped in cross-section so as to be wedged towards said member by pressure exerted upon the packing in a direction transverse to the side walls thereof, and subdivided into two circumferentially extending rows of overlapping segments, and formed with two fin-like projections extending from the outer margin of the core in opposite directions substantially parallel to the direction of the pressure aforesaid, which projections serve to effect a keying engagement between the core and the packing material and are so shaped that both the outer and inner faces are substantially normal to the line of wedge-action-thrust of the core towards the member to be packed, for the purpose described.

In testimony whereof I affix my signature.

WILLIAM ROBERT BELDAM.